Figure 1:
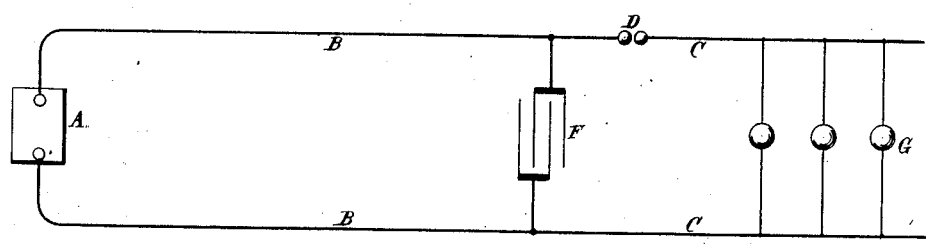

(No Model.)

N. TESLA.
METHOD OF AND APPARATUS FOR ELECTRICAL CONVERSION AND DISTRIBUTION.

No. 462,418. Patented Nov. 3, 1891.

Witnesses:
Raphael Netter
Frank B. Murphy.

Inventor
Nikola Tesla
by Duncan & Page.
Attorneys.

UNITED STATES PATENT OFFICE.

NIKOLA TESLA, OF NEW YORK, N. Y.

METHOD OF AND APPARATUS FOR ELECTRICAL CONVERSION AND DISTRIBUTION.

SPECIFICATION forming part of Letters Patent No. 462,418, dated November 3, 1891.

Application filed February 4, 1891. Serial No. 380,182. (No model.)

*To all whom it may concern:*

Be it known that I, NIKOLA TESLA, a subject of the Emperor of Austria, from Smiljan, Lika, border country of Austria-Hungary, residing at New York, in the county and State of New York, have invented certain new and useful Improvements in Methods of and Apparatus for Electrical Conversion and Distribution, of which the following is a specification, reference being had to the drawings accompanying and forming a part of the same.

This invention is an improvement in methods of and apparatus for electrical conversion, designed for the better and more economical distribution and application of electrical energy for general useful purposes.

My invention is based on certain electrical phenomena which have been observed by eminent scientists and recognized as due to laws which have been in a measure demonstrated, but which, so far as I am aware, have not hitherto been utilized or applied with any practically useful results. Stated briefly, these phenomena are as follows: First, if a condenser or conductor possessing capacity be charged from a suitable generator and discharged through a circuit, the discharge under certain conditions will be of an intermittent or oscillatory character; second, if two points in an electric circuit through which a current rapidly rising and falling in strength is made to flow be connected with the plates or armatures of a condenser, a variation in the current's strength in the entire circuit or in a portion of the same only may be produced; third, the amount or character of such variation in the current's strength is dependent upon the condenser capacity, the self-induction and resistance of the circuit or its sections, and the period or time rate of change of the current. It may be observed, however, that these several factors—the capacity, the self-induction, resistance, and period—are all related in a manner well understood by electricians; but to render such conversion as may be effected by condensers practically available and useful it is desirable, chiefly on account of the increased output and efficiency and reduced cost of the apparatus, to produce current-impulses succeeding each other with very great rapidity, or, in other words, to render the duration of each impulse, alternation, or oscillation of the current extremely small. To the many difficulties in the way of effecting this mechanically, as by means of rotating switches or interrupters, is perhaps due the failure to realize practically, at least to any marked degree, the advantages of which such a system is capable. To obviate these difficulties, I have in my present invention taken advantage of the fact above referred to, and which has been long recognized, that if a condenser or a conductor possessing capacity be charged from a suitable source and be discharged through a circuit the discharge under certain conditions, dependent on the capacity of the condenser or conductor, the self-induction and resistance of the discharging circuit, and the rate of supply and decay of the electrical energy, may be effected intermittently or in the form of oscillations of extremely small period.

Briefly stated in general terms, the plan which I pursue in carrying out my invention is as follows:

I employ a generator, preferably, of very high tension and capable of yielding either direct or alternating currents. This generator I connect up with a condenser or conductor of some capacity and discharge the accumulated electrical energy disruptively through an air-space or otherwise into a working circuit containing translating devices and, when required, condensers. These discharges may be of the same direction or alternating and intermittent, succeeding each other more or less rapidly or oscillating to and fro with extreme rapidity. In the working circuit, by reason of the condenser action, the current impulses or discharges of high tension and small volume are converted into currents of lower tension and greater volume. The production and application of a current of such rapid oscillations or alternations (the number may be many millions per second) secures, among others, the following exceptional advantages: First, the capacity of the condensers for a given output is much diminished; second, the efficiency of the condensers is increased and the tendency to become heated reduced, and, third, the range of conversion is enlarged. I have thus succeeded in producing a system or method of conversion radically different from what has been done heretofore—first, with respect to the number of impulses, alternations, or oscillations of current per unit of time, and, second, with respect to the manner in which the impulses are obtained. To express this result, I define the working current as one of an excessively small period or of an excessively large number of impulses or alternations or oscillations per unit of time, by which I mean not a thousand or even twenty or thirty thousand per second, but many times that number, and one which is made intermittent, alternating, or oscillating of itself without the employment of mechanical devices.

I now proceed to an explanation somewhat more in detail of the nature of my invention, referring to the accompanying drawings.

The two figures are diagrams, each representing a generating-circuit, a working circuit, means for producing an intermittent or oscillating discharge, and condensers arranged or combined as contemplated by my invention.

In Figure 1, A represents a generator of high tension; B B, the conductors which lead out from the same. To these conductors are connected the conductors C of a working circuit containing translating devices, such as incandescent lamps or motors G. In one or both conductors B is a break D, the two ends being separated by an air-space or a film of insulation, through which a disruptive discharge takes place. F is a condenser, the plates of which are connected to the generating-circuit. If this circuit possess itself sufficient capacity, the condenser F may be dispensed with.

Figure 2:
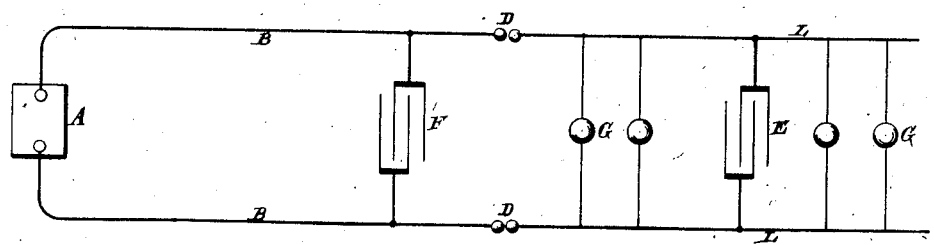

In Fig. 2 the generating-circuit B B contains a condenser F and discharges through the air-gaps D into the working circuit C, to any two points of which is connected a condenser E. The condenser E is used to modify the current in any part of the working circuit, such as L.

It may conduce to a better understanding of the invention to consider more in detail the conditions existing in such a system as is illustrated in Fig. 1. Let it be assumed, therefore, that in the system there shown the rate of supply of the electrical energy, the capacity, self-induction, and the resistance of the circuits are so related that a disruptive, intermittent, or oscillating discharge occurs at D. Assume that the first-named takes place. This will evidently occur when the rate of supply from the generator is not adequate to the capacity of the generator, conductors B B, and condenser F. Each time the condenser F is charged to such an extent that the potential or accumulated charge overcomes the dielectric strength of the insulating-space at D the condenser is discharged. It is then recharged from the generator A, and this process is repeated in more or less rapid succession. The discharges will follow each other the more rapidly the more nearly the rate of supply from the generator equals the rate at which the circuit including the generator is capable of taking up and getting rid of the energy. Since the resistance and self-induction of the working circuit C and the rapidity of the successive discharges may be varied at will, the current strength in the working and generating circuit may bear to one another any desired relation.

To understand the action of the local condenser E in Fig. 2, let a single discharge be first considered. This discharge has two paths offered—one to the condenser E, the other through the part L of the working circuit C. The part L, however, by virtue of its self-induction, offers a strong opposition to such a sudden discharge, while the condenser, on the other hand, offers no such opposition. The result is that practically no current passes at first through the branch L, but presumably opposite electricities rush to the condenser-coatings, this storing for the moment electrical energy in the condenser. Time is gained by this means, and the condenser then discharges through the branch L, this process being repeated for each discharge occurring at D. The amount of electrical energy stored in the condenser at each charge is dependent upon the capacity of the condenser and the potential of its plates. It is evident, therefore, that the quicker the discharges succeed each other the smaller for a given output need be the capacity of the condenser and the greater is also the efficiency of the condenser. This is confirmed by practical results.

The discharges occurring at D, as stated, may be of the same direction or may be alternating, and in the former case the devices contained in the working circuit may be traversed by currents of the same or alternately-opposite direction. It may be observed, however, that each intermittent discharge occurring at D may consist of a number of oscillations in the working circuit or branch L.

A periodically-oscillating discharge will occur at D in Fig. 1 when the quantities concerned bear a certain relation expressed in well-known formulæ and ascertained by simple experiment. In this case it is demonstrated in theory and practice that the ratio of the strength of the current in the working to that in the generating circuits is the greater the greater the self-induction, and the smaller the resistance of the working circuit the smaller the period of oscillation.

I do not limit myself to the use of any specific forms of the apparatus described in connection with this invention nor to the precise arrangement of the system with respect to its details herein shown. In the drawings return-wires are shown in the circuit; but it will be understood that in any case the ground may be conveniently used in lieu of the return-wire.

What I claim is—

1. The method of electrical conversion herein described, which consists in charging a condenser or conductor possessing capacity and maintaining a succession of intermittent or oscillating disruptive discharges of said conductor into a working circuit containing translating devices.

2. In a system of electrical conversion, the combination of a generator or source of electricity and a line or generating circuit containing a condenser or possessing capacity, and a working circuit operatively connected with the generating-circuit through one or more air-gaps or breaks in the conducting medium, the electrical conditions being so adjusted that an intermittent or oscillating disruptive discharge from the generating into the working circuit will be maintained, as set forth.

NIKOLA TESLA.

Witnesses:
 ROBT. F. GAYLORD,
 PARKER W. PAGE.